United States Patent

Ruddick et al.

[11] Patent Number: 5,911,440
[45] Date of Patent: Jun. 15, 1999

[54] PRETENSIONER FOR VEHICLE SAFETY RESTRAINT

[75] Inventors: Shaun Peter Ruddick, Nr. Penrith; Raymond George Evans, Carlisle, both of United Kingdom

[73] Assignee: Breed Automotive Technology, Inc., Lakeland, Fla.

[21] Appl. No.: 08/908,279

[22] Filed: Aug. 7, 1997

[30] Foreign Application Priority Data

Aug. 8, 1996 [GB] United Kingdom .................. 9616639
Jun. 12, 1997 [GB] United Kingdom .................. 9712280

[51] Int. Cl.⁶ .................................................. B60R 22/36
[52] U.S. Cl. ............................................................ 280/806
[58] Field of Search ............................................. 280/806

[56] References Cited

U.S. PATENT DOCUMENTS

| | | | |
|---|---|---|---|
| 4,152,025 | 5/1979 | Bendler et al. | 297/386 |
| 4,917,210 | 4/1990 | Danicek et al. | 280/806 |
| 5,207,618 | 5/1993 | Nishizawa | 280/806 |
| 5,310,220 | 5/1994 | Föhl | 280/806 |
| 5,519,997 | 5/1996 | Specht | 60/362 |
| 5,564,748 | 10/1996 | Kmiec et al. | 280/806 |

FOREIGN PATENT DOCUMENTS

| | | |
|---|---|---|
| 0 306 299 A1 | 3/1989 | European Pat. Off. . |
| 0 625 450 A2 | 11/1994 | European Pat. Off. . |
| 1 407 954 | 10/1975 | United Kingdom . |
| 1 440 587 | 6/1976 | United Kingdom . |

*Primary Examiner*—Kenneth R. Rice
*Attorney, Agent, or Firm*—Markell Seitzman

[57] ABSTRACT

A pretensioner for a vehicle safety restraint having a cylindrical hollow tube and a piston connected via a cable to a part of the vehicle safety restraint for tightening the safety restraint in the event of a crash. The piston having a gas generator with gas vents directed with a component in the opposite direction to that of the piston movement for belt tightening. The piston also having locks and seals, the locks being operable only against the belt loosening direction, and wherein the gas generator is positioned forward of the locking mechanism in the direction of piston movement for belt tightening.

A more compact, cost effective pretensioner is possible.

10 Claims, 1 Drawing Sheet

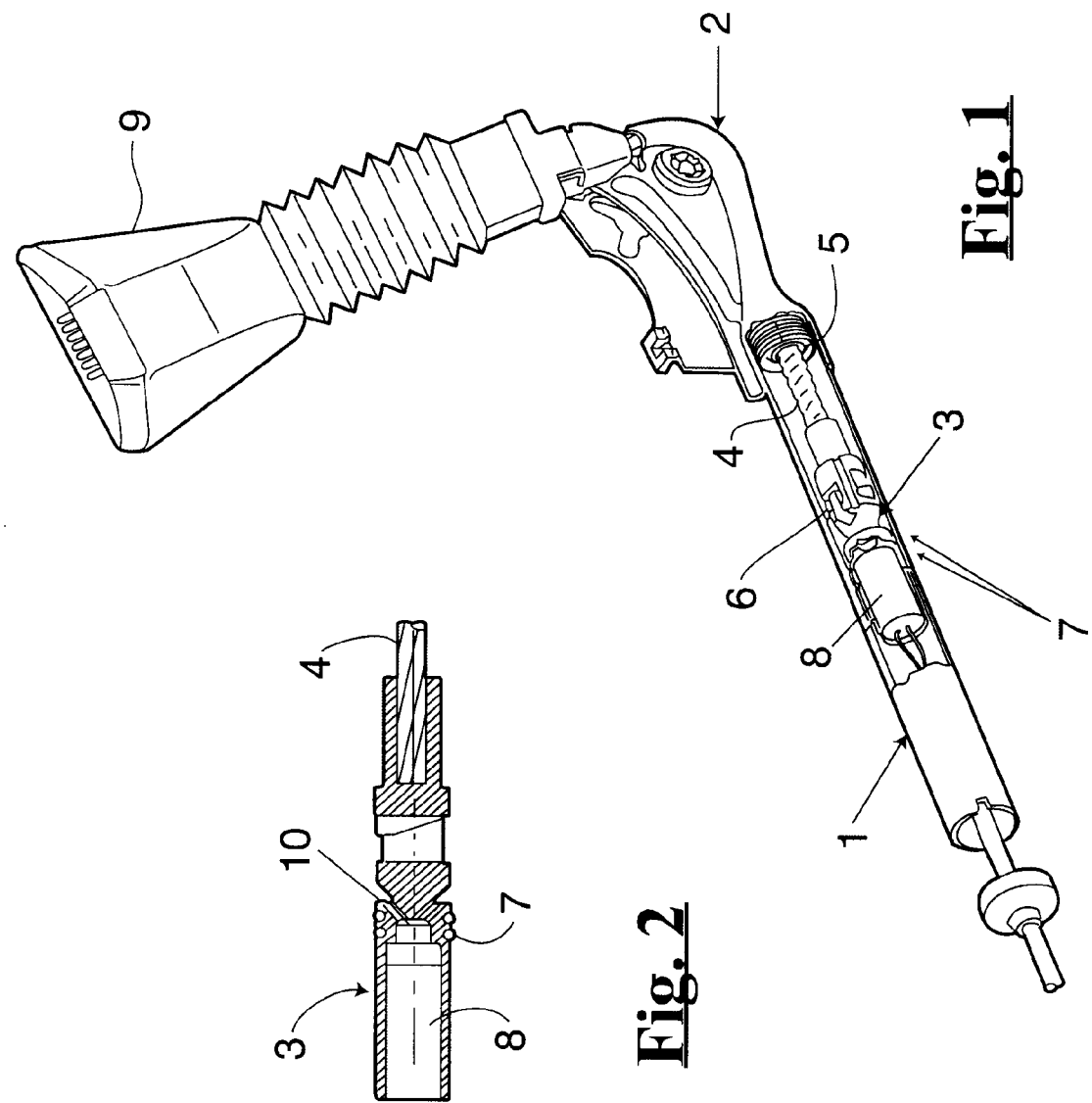

PRETENSIONER FOR VEHICLE SAFETY RESTRAINT

DESCRIPTION

The present invention relates to a pretensioner for a vehicle safety restraint and particularly to a so called pyrotechnic pretensioner in which the force of a gas generator is used to retract a cable and either pull back a buckle fastening or rewind a retractor spool in a three point safety belt arrangement. This occurs on actuation of a crash sensor and has the effect of taking any slack out of the safety belt so as to more safely position and more securely restrain a vehicle occupant in a crash situation. Slack may occur due to bulky clothes or to mis-seating of the occupant.

Typically such a pyrotechnic pretensioner comprises a piston fixed to a cable which in turn is connected to a part of the safety restraint mechanism. The piston is slidably mounted in a cylindrical guide tube. When conditions indicative of a crash are sensed (for example acceleration or deceleration exceeding a predetermined level), then a gas generator, typically mounted adjacent the tube, is triggered to pressurise the tube and push the piston therealong so as to pull back a part of the safety restraint mechanism in a belt tightening direction. At the end of the piston stroke a lock comes into play to prevent the piston moving back down the tube. Obviously appropriate seals must be provided.

Such traditional arrangements are necessarily bulky, expensive and subject to particularly tight engineering tolerances since it is imperative that they work reliably and speedily.

The large size of a traditional pyrotechnic pretensioner is a particular problem since vehicle manufacturers are reluctant to sacrifice passenger space to make way for such devices.

The present invention aims to overcome at least one of the problems of known pretensioning arrangements.

According to the present invention there is provided:

a pretensioner for a vehicle safety restraint comprising:
  a cylindrical hollow tube
  a piston member connected via a cable to a part of the vehicle safety restraint for tightening the safety restraint in the event of a crash
wherein
  the piston member comprises a gas generator having gas vents directed with a component in the opposite direction to that of the piston movement for belt tightening, and the piston member comprises locking and sealing means, the locking means being operable only against the belt loosening direction, and wherein the gas generator is positioned forward of the locking mechanism in the direction of piston movement for belt tightening.

For a better understanding of the present invention and to show how the same may be carried into effect, reference will now be made to the accompanying drawings in which:

FIG. 1 is a perspective, part cut away, view of a pretensioning arrangement according to the present invention;

FIG. 2 is a cross section of part of FIG. 1.

The pretensioning arrangement illustrated consists of a pressure tube 1, and a cable guide bracket 2. Inside the pressure tube 1 is a piston device 3, which combines a gas generator 8 and a locking device 6 into one component. This piston 3 is attached to a cable 4 which passes out of the pressure tube 1 through a seal 5, and is attached to a buckle head 9 of a safety restraint via the cable guide bracket 2.

The inside surface of the pressure tube 1 has circumferential, parallel or screw thread grooves in a "saw tooth" cross-sectional form. The longer faces of the teeth are on the buckle head side so that the teeth are inclined in the pretensioning direction. A locking device 6 in piston 3 is of the known elliptical type consisting of an elliptical plate inclined to the longitudinal axis of the tube. As the piston moves along the tube in the pretensioning phase the elliptical plate is free to ride over the longer faces of the teeth. However at the end of the piston stroke when the crash load forces tend to pull the piston back towards the buckle head, the elliptical plate tilts into an orientation less inclined to the cylinder axis and catches on the tips of the teeth so as to be held against movement towards the buckle head by the shorter faces of the teeth thus positively locking the piston in the tube.

The system is activated by an electrical pulse to the gas generator 8, which then rapidly releases a volume of gas via four vent holes 10 (see FIG. 2) pressurising the system between the seal 5, and the two "O" ring seals 7 on the gas generator 8. The two "O" ring seals 7 are separated by a distance which is ½ pitch offset from the pitch of the "saw tooth" ribs inside the pressure tube 1, so that at any instant, at least one "O" ring is providing a seal with the ribs.

The gas pressure forces the piston 3 along the tube 1, retracting the cable 4 and the buckle head 9, until the force in the seat belt system equals the retracting force or full retraction of the buckle is complete.

As the crash develops, the load on the restraint system builds up in the opposite direction to the pretensioning direction and the piston 3 attempts to move back down the tube 1. The elliptical locking device then engages with the "saw tooth" ribs inside the pressure tube 1, holding the cable 4, buckle head 9 and restraint system in the pretensioned position.

We claim:

1. A pretensioner for a vehicle safety restraint comprising:
  a cylindrical hollow tube
  a piston member arranged with and for movement along the hollow tube and connected via a cable to a part of the vehicle safety restraint for tightening the safety restraint in the event of a crash
wherein
  the piston member comprises a gas generator having gas vents directed with a component in the opposite direction to that of the piston movement for belt tightening, and the piston member comprises locking and sealing means, the locking means being operable only against the belt loosening direction, and wherein the gas generator is positioned forward of the locking mechanism in the direction of piston movement for belt tightening.

2. A pretensioner according to claim 1 wherein the inside surface of the hollow tube has circumferential, parallel or screw thread grooves in a "saw tooth" cross-sectional form.

3. A pretensioner according to claim 2, wherein the longer faces of the saw teeth are on the buckle head side so that the teeth are inclined in the pretensioning direction.

4. A pretensioner according to claim 3, wherein the locking means comprises an elliptical plate inclined to the longitudinal axis of the tube which is arranged so that as the piston moves along the tube in the pretensioning phase the elliptical plate is free to ride over the longer faces of the teeth, whereas at the end of the piston stroke when the crash load forces tend to pull the piston back towards the buckle head, the elliptical plate tilts into an orientation in which the elliptical plate catches on the tips of the teeth so as to be held against movement towards the buckle head by the shorter faces of the teeth thus positively locking the piston in the tube.

5. A pretensioner according to claim 3, wherein there are two "O" ring seals separated by a distance which is ½ pitch offset from the pitch of the "saw tooth" ribs inside the pressure tube 1.

6. A pretensioner according to claim 2, wherein the locking means comprises an elliptical plate inclined to the longitudinal axis of the tube which is arranged so that as the piston moves along the tube in the pretensioning phase the elliptical plate is free to ride over the longer faces of the teeth, whereas at the end of the piston stroke when the crash load forces tend to pull the piston back towards the buckle head, the elliptical plate tilts into an orientation in which the elliptical plate catches on the tips of the teeth so as to be held against movement towards the buckle head by the shorter faces of the teeth thus positively locking the piston in the tube.

7. A pretensioner according to claim 2, wherein there are two "O" ring seals separated by a distance which is ½ pitch offset from the pitch of the "saw tooth" ribs inside the pressure tube 1.

8. A pretensioner according to claim 1, wherein the locking means comprises an elliptical plate inclined to the longitudinal axis of the tube which is arranged so that as the piston moves along the tube in the pretensioning phase the elliptical plate is free to ride over the longer faces of the teeth, whereas at the end of the piston stroke when the crash load forces tend to pull the piston back towards the buckle head, the elliptical plate tilts into an orientation in which the elliptical plate catches on the tips of the teeth so as to be held against movement towards the buckle head by the shorter faces of the teeth thus positively locking the piston in the tube.

9. A pretensioner according to claim 8, wherein there are two "O" ring seals separated by a distance which is ½ pitch offset from the pitch of the "saw tooth" ribs inside the pressure tube 1.

10. A pretensioner according to claim 1, wherein there are two "O" ring seals separated by a distance which is ½ pitch offset from the pitch of the "saw tooth" ribs inside the pressure tube 1.

* * * * *